United States Patent [19]

Tornas

[11] 4,071,971
[45] Feb. 7, 1978

[54] DEVICE FOR INCREASING AND STANDARDIZING THE SCATTER OF SHOTGUNS, PARTICULARLY FOR SKEET SHOOTING

[76] Inventor: Olle Tornas, Berghallavagen 8, Jonkoping, Sweden

[21] Appl. No.: 681,564

[22] Filed: Apr. 29, 1976

[30] Foreign Application Priority Data

May 5, 1975 Sweden .................................. 7505163

[51] Int. Cl.² ........................................... F41C 21/00
[52] U.S. Cl. ...................................................... 42/79
[58] Field of Search ............................................ 42/79

[56] References Cited

U.S. PATENT DOCUMENTS

| 329,303 | 10/1885 | Fosberry | 42/79 |
|---|---|---|---|
| 863,431 | 8/1907 | Parker | 42/79 |
| 2,054,132 | 9/1936 | Lewis | 42/79 |
| 2,340,821 | 2/1944 | Russell | 42/79 |
| 2,700,839 | 2/1955 | Finlay et al. | 42/79 |
| 3,367,055 | 2/1968 | Powell | 42/79 |

Primary Examiner—Charles T. Jordan
Attorney, Agent, or Firm—Dorfman, Herrell and Skillman

[57] ABSTRACT

A device for controlling the scatter of shot wherein the barrel of the shotgun adjacent the muzzle is provided with grooves disposed at a small angle to the longitudinal axis of the barrel. The grooved portion of the muzzle is constricted to provide a converging then diverging wall portion. The roots of the grooves define a cylinder having a diameter comparable to the diameter of the barrel. The width of the grooves is greater than the size of the shot and discharge of the shot through the barrel past the grooves produces a twisting movement which provides an uniform distribution of the shot.

14 Claims, 4 Drawing Figures

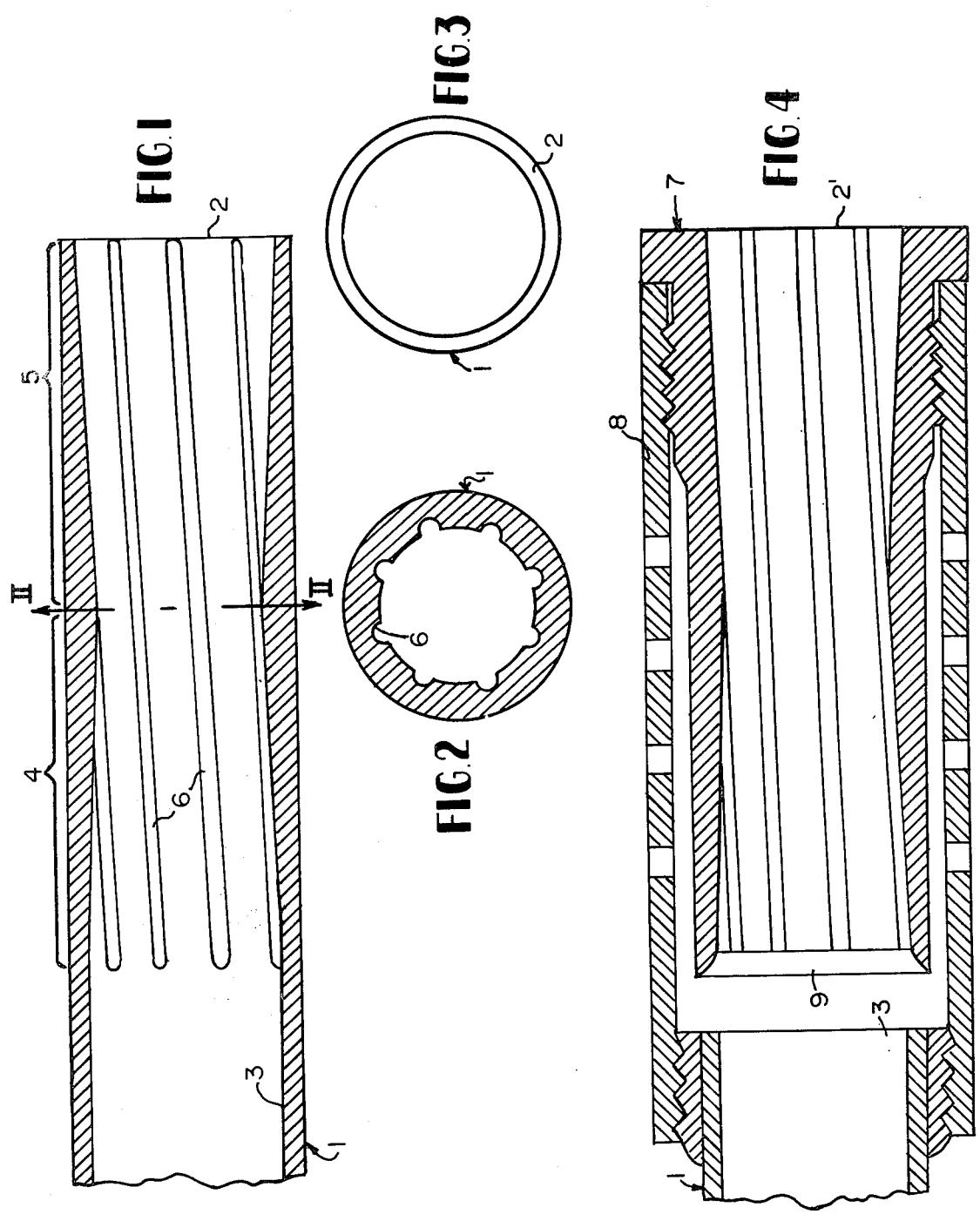

DEVICE FOR INCREASING AND STANDARDIZING THE SCATTER OF SHOTGUNS, PARTICULARLY FOR SKEET SHOOTING

The present invention relates to a device for increasing and standardizing the scatter of shot pellets discharged from the muzzle of a shotgun, and is particularly applicable to guns used for skeet shooting.

Particularly in skeet shooting, the target is often to be hit at a very short distance, e.g. 10 to 15 meters, for which reason greater scatter of the shot cluster at short distances is required for an optimum chance of hitting. For this reason, in skeet shooting use is generally made of guns with a so-called cylinder bore. This means that the barrel or barrels are made internally cylindrical in their muzzle region, with no constriction. If, on the other hand, greater compactness of the shot, and thus less scatter of the shot cluster is desired, e.g. in trap shooting, then a suitably conical constriction of the barrel muzzle is chosen, generally known as "choke".

Now a cylindrical bore at the muzzle region sets a certain limit to the scatter, so that if an enlargement is provided in the muzzle region, it has no influence worth mentioning on the scatter, because the charge of shot, because of its forward motion, does not come into contact with the enlargement. For this reason it has been proposed, e.g. in U.S. Pat. No. 2,484,988, and in U.S. Pat. No. 2,700,839, in the muzzle region of a barrel to constrict its inner wall and to provide grooves at a slant to the longitudinal axis of the barrel, whose function it is to hold the rim shot and give them a twisting movement, thus giving them a certain centrifugal force, which prevails after leaving the muzzle, thus imparting greater scatter to the shot cluster.

Such a solution is, however, not satisfactory because increased scatter is obtained by losing regularity and uniformity of the scatter pattern, i.e. the rim shot, in particular are spread out irregularly, and even if the target is hit by the shot cluster, there is no guarantee of breaking it if it is as small as a clay pigeon.

The present invention has the problem of not only an enlargement of the scatter of shotguns, but also a substantially uniform distribution of the shot cluster over the entire region of scatter. The invention moreover has the purpose of a general improvement and development of the pertinent technique.

In accordance with the invention, this problem is solved through creating an arrangement of the aforesaid kind, in which the muzzle of the barrel is provided with converging interior wall means having grooves disposed around the periphery, the bottoms of which are on a circle coaxial with and conforming to the cylindrical contour of the barrel and the depth of which is greater than the radius of the shot pellets. In this way, a deformation of the rim shot is prevented, which is the case with already-known devices of this kind, while, at the same time, the major part of the rim shot undergoes no radial deviation, but in their peripheral path are left with an unaltered spacing from the center. As already mentioned, deformation of the individual shot is hereby avoided, and there are also no uncontrolled turbulences, because in the enlargement near the muzzle there is extensive equalization and stabilization of all rim shot, through which the centrifugal forces are acted on sufficiently to effect a stabilization, and thus a uniform distribution of the rim shot in the outer region of the cluster of shot.

Further characteristics and advantages of the invention are evident from the following description, relative to the annexed drawings, wherein:

FIG. 1 shows one example of the arrangement of the invention in a diametral longitudinal section;

FIG. 2 shows a cross section through the arrangement of FIG. 1, along the line II–II;

FIG. 3 shows a view from the right of FIG. 1; and

FIG. 4 shows a diametral longitudinal section through a modified example of an arrangement according to the invention.

In the figures of the drawing, 1 designates the muzzle region of a not-further-shown shotgun. 2 designates the barrel muzzle or an adapted muzzle.

At a certain spacing from the muzzle 2, the substantially cylindrical and smooth inner wall 3 of the barrel merges into a preferably conically-contracted section 4 which, in a practical example, is 20 to 60 mm, and preferably 35 mm long. Section 4 is adjoined by a preferably conically enlarged section 5, whose outer end may coincide with the muzzle 2. In a practical example, the inner diameter 3 of a 12-gauge barrel may amount to approximately 18.5 mm; while in the region of the greatest constriction, i.e. in the transition region between sections 4 and 5, it may be approximately 15.3 mm. There is thus obtained a total constriction of 3.2 mm; or of 10 to 20% for other gauges. The length of section 5 may correspond to that of section 4. Thus, in the given example, the two sections extend some 70 mm.

The two sections 4 and 5 comprise grooves 6 or the like set at a small angle from the longitudinal axis of the barrel, e.g. an angle of 1° to 4°, and preferably 2° to 2.75°. The root of the grooves 6 or the like substantially follows the course of the inner wall 3, which means that the grooves 6 or the like, in the transition region between sections 3 and 4 and 5 and 2 respectively, are vanishingly flat; whereas, in the transition region between sections 4 and 5, they reach their maximum depth, which is 1.6 mm in the following example. The cross-section of the grooves 6 or the like is preferably rounded, whereby the width is made greater than the diameter of the shot discharged.

The slant angle or conicity angle of sections 4 and 5 may be between 1° and 4° from the longitudinal axis, and preferably 2° and 3°. Hereby the slant in the two sections may be the same, or in a preferred practical example, may be approximately 2° in section 4, and approximately 2.5° in section 5.

Section 4 may enlarge directly from the inner wall 3 of the barrel, or else the end of section 4, which abuts section 3, may be of greater diameter than section 3, so that there is a slight enlargement at this region, and a very short free flight of the shot, i.e. without contacting the inner wall of the barrel.

FIGS. 1 to 3 show an example of an integrated design in the case of a gun barrel. The invention is, however, in no wise limited to such a design; and FIG. 4, therefore, shows an application of the invention to an adapter designated as a whole by 7. Such an adapter may be screwed directly on the muzzle of a barrel, or may have an intermediate ventilated sleeve 8, as shown in FIG. 4. Hereby the adapter 7 may be located somewhat from the corresponding end of the muzzle of the actual barrel. In the latter case, it is desirable to provide the adapter entrace with a bevel 9 all round. Because of the ventilated construction of the sleeve 8, it is in known wise possible for a part of the gases to be let out sideways before reaching the muzzle 2, through which, among other things, less recoil is obtained. For the rest, the inner design of the adapter 7 corresponds with what has already been explained in connection with FIGS. 1 to 3.

It is not absolutely necessary that section 5 have a conical enlargement. It is also possible to have a substantially cylindrical, or even a slightly constricted design, while retaining the other characteristics. Furthermore, the transition region of sections 4 and 5 may, for example, be a short cylindrical section.

In a further modification of the invention, the grooves 6 or the like may be somewhat slanted in cross section, i.e. their side walls are at least in part made more tangential than radial.

The forms of construction described in the foregoing and shown in the drawings are not to be regarded as limiting examples, but may be modified as desired and complemented within the scope of the inventive idea and of the following claims. Although the purpose of the invention is to obtain, particularly in skeet shooting, a scatter of some 50% greater than in the case of a cylinder bore, it is self-evident within the scope of the invention to envisage other purposes, e.g. hunting at various close distances. Such constructional modifications do not, however, impair the advantages of the invention, which reside chiefly in non-deformation, and only immaterial braking or slowing down of the rim shot. In this way, high striking energy is also retained for the rim shot, so that they are able, e.g. at an acceptable distance, to shatter a clay pigeon. A further advantage of the invention is that it may also be applied to double-barrel guns, e.g. when they are made according to FIGS. 1 to 3. In the illustrated and described examples, there are provided eight grooves or the like. Naturally, this number may be decreased and in particular be increased, and the grooves 6 or the like may be even replaced by other guiding devices. For example, the fields between adjacent grooves or the like may be designed as ribs or otherwise, so that it is no longer really possible to speak of grooves as characterizing the spaces between such ribs. Such a design should, however, be comprised in the term "ribs or the like". It is also possible to make the grooves 6 or the like considerably wider than the shot to be used. Furthermore, the grooves or the like do not necessarily have to run quite straight, as shown by the drawing, but may, for example, have an infinitely variable slope of 0° to 4°, i.e. the slope of the grooves 6 or the like may be less near the section 3 than near the muzzle 2.

Such modifications do not impair the essential advantages of the invention. The maximum radial load on the individual shot is naturally in the region of the greatest constriction. Here, however, the rim shot, guided in the grooves 6 or the like, thanks to the groove depth, and thus the space available to deviate, do not become deformed and also do not become deviated outward or sideways, as is the case with previously-known designs. Instead, all rim shot stay in their path of travel, and in the region of the two sections 4 and 5, adjacent shot are acted on peripherally so that in the fields between the grooves 6 or the like they receive a twisting movement. Furthermore, the invention avoids great and uncontrolled turbulence in the region of maximum constriction, because accompanying or following gases are able to escape through the grooves 6 or the like, which is naturally the case where it is necessary, i.e. in the region of maximum constriction. Thus, the invention is able to effect great stabilization of the rim shot although they are more scattered, whereby, thanks to the aforesaid stabilization, there is obtained uniform distribution of all shot, particularly the rim shot.

I claim:

1. A device for increasing and standardizing the scatter of shot pellets discharged from the muzzle of a shotgun barrel having at its breech end a substantially cylindrical contour, comprising converging interior wall means adjacent the muzzle of the gun barrel, a number of grooves in said wall means set at a small angle relative to the geometric axis of the barrel, characterized in that the bottoms of the grooves are on a circle coaxial with and conforming to said cylindrical contour, and the depth of said grooves is greater than the radius of said shot pellets.

2. A device according to claim 1, characterized in that the converging wall means is adjoined by an approximately mirror-symmetrical diverging wall means having grooves which end at the barrel muzzle.

3. A device according to claim 1, characterized in that the converging wall means is in the range of 20 to 60 mm long.

4. A device according to claim 3 wherein the converging wall means is approximately 35 mm long.

5. A device according to claim 1 characterized in that the inner diameter of the wall means in the region of greatest constriction is in the range of 10 to 20% less than the inner diameter of said cylindrical contour.

6. A device according to claim 5 wherein said cylindrical contour has an inner diameter of approximately 18.5 mm, while the inner diameter of greatest constriction of the wall means is approximately 15.3 mm.

7. A device according to claim 1 characterized in that the grooves make an angle of 1° to 4°, with the geometric axis of the barrel.

8. A device according to claim 7 wherein the grooves make an angle of 2° to 2.75°, with the geometric axis of the barrel.

9. A device according to claim 1 characterized in that the grooves are of a rounded cross-section and in that their width is greater than the diameter of the shot pellets.

10. A device according to claim 1 characterized in that the slope-angle or conicity-angle of the converging interior wall means relative to the geometric barrel-axis, is between 1° and 4°.

11. A device according to claim 10 wherein said angle is between 2° and 3°.

12. A device according to claim 10 wherein said converging wall means is adjoined by diverging wall means having grooves which end at the barrel muzzle.

13. A device according to claim 12, characterized in that the slope-angle or conicity-angle of the converging wall means relative to the geometric axis of the barrel, amounts to at least approximately 2°, while the slope-angle or conicity-angle of the diverging wall means amounts to at least approximately 2.5°.

14. A device according to claim 1 characterized in that approximately eight grooves are provided.

* * * * *